United States Patent [19]

Aarons

[11] Patent Number: 4,710,130
[45] Date of Patent: Dec. 1, 1987

[54] DICHOTIC-DIOTIC PAIRED-ASSOCIATION FOR LEARNING OF VERBAL MATERIALS

[76] Inventor: Louis Aarons, 8348 Niles Center Rd., Skokie, Ill. 60077

[21] Appl. No.: 946,037

[22] Filed: Dec. 24, 1986

[51] Int. Cl.$^4$ .................... G09B 19/06; G09B 50/60; G09B 50/004
[52] U.S. Cl. .................................. 434/157; 434/319; 434/314
[58] Field of Search ............... 434/156, 157, 319, 315, 434/316, 314

[56] References Cited

U.S. PATENT DOCUMENTS 4,170,834 10/1979 Smart .................................. 434/157

Primary Examiner—Theodore M. Blum
Assistant Examiner—Gregory C. Issing
Attorney, Agent, or Firm—Gary, Juettner & Pyle

[57] ABSTRACT

A product and method for the presentation of prerecorded audio-visual sets of related words or phrases for their learned association is disclosed wherein the learner is presented simultaneous and sequential audio material while viewing spatially compatible visual representations. The first auditory presentation directs a known stimulus to the learner's left ear and an unknown response to the right ear. The stimulus is at a lower intensity than the response and the onset of the stimulus is slightly before or simultaneous with the onset of the response. The next auditory presentation directs the response term to both ears. The auditory presentations are concurrent with exposure to visual representations of the stimulus and response terms. This optimal combination saves time, improves performance, and enhances the efficiency of rehearsal for learning the association of the verbal stimulus-response materials.

20 Claims, 4 Drawing Figures

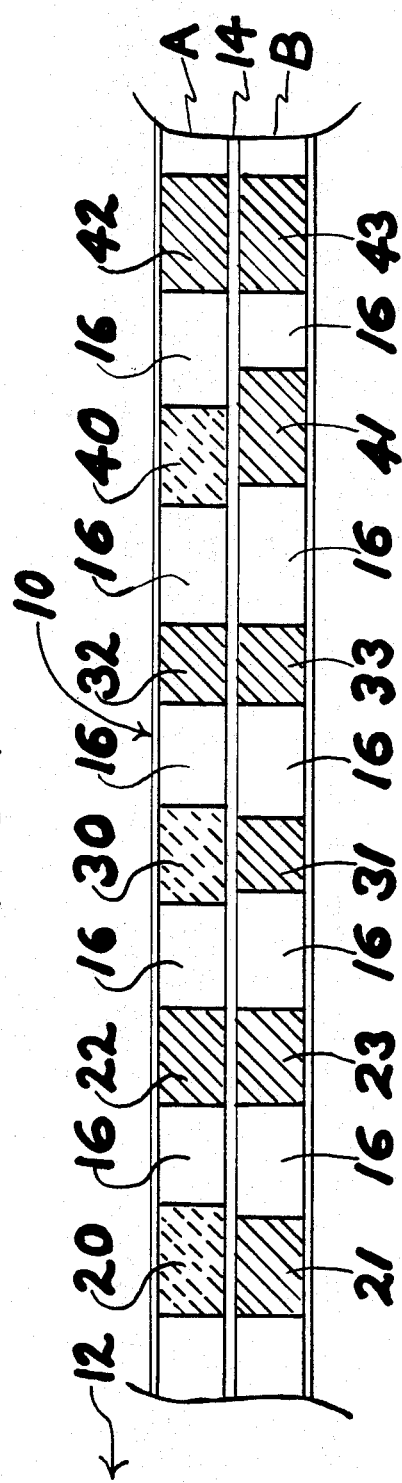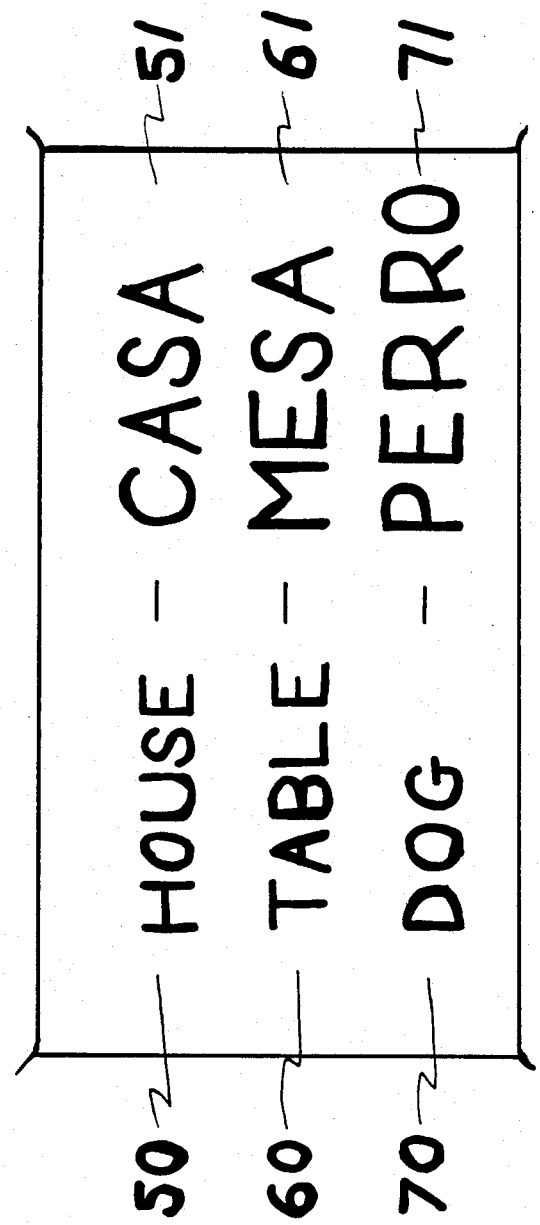

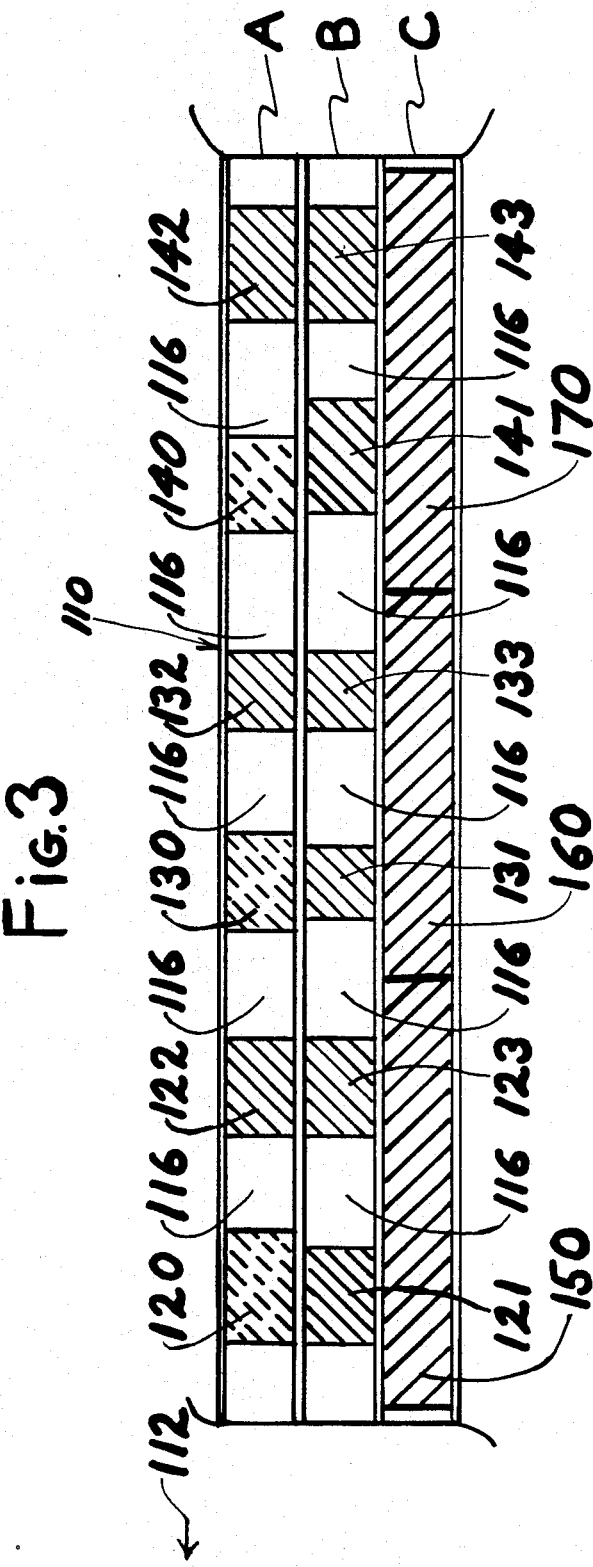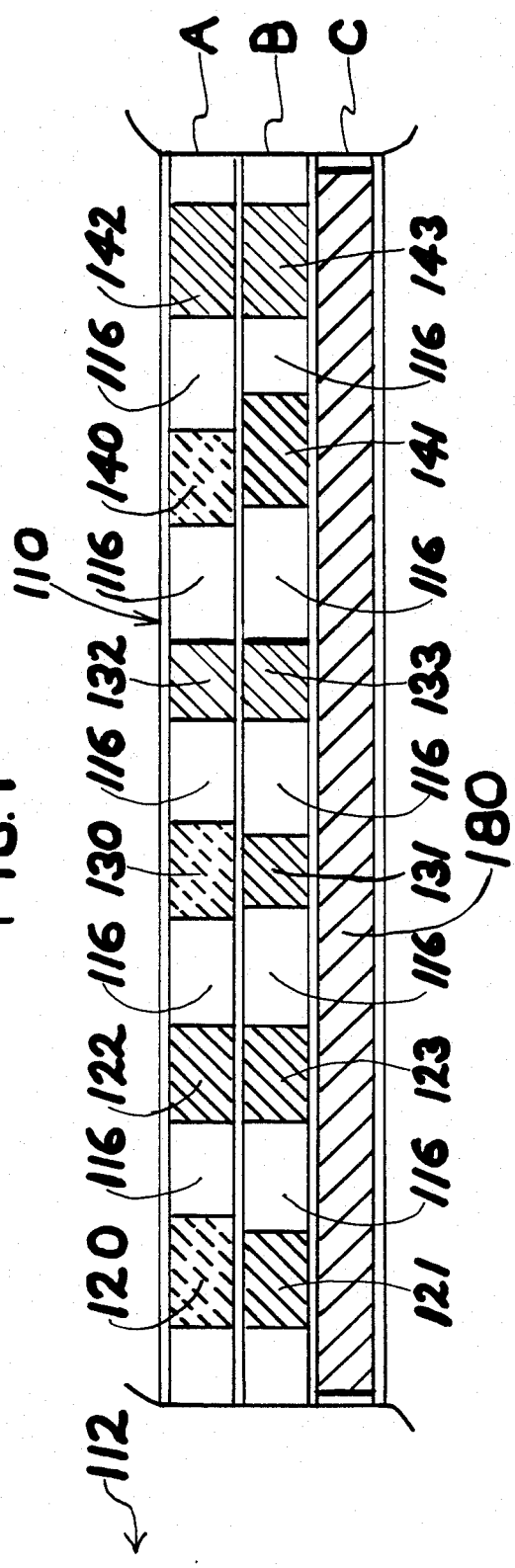

DICHOTIC-DIOTIC PAIRED-ASSOCIATION FOR LEARNING OF VERBAL MATERIALS

BACKGROUND OF THE INVENTION

This invention relates to prerecorded instructional materials and, more particularly, audio or audio-visual presentations of associated terms in dichotic-diotic sequence, and methods of use of the same for associative learning.

Prerecorded materials have been used in teaching many subjects. The organization of the materials often depends upon what is known and not known by the learner. For example, in foreign language teaching, words or phrases in a foreign language are often learned through their association with equivalent words or phrases in the learner's native language. Other associations may be between known words in stimulus-response format to produce combinations with new meanings, as for example, in the learning of word collacations of idiomatic phrases, such as, "sure-enough." For clarity the following descriptions are directed to teaching words and phrases of a foreign language, but it is to be understood that the disclosure is also applicable to other subjects where associative techniques may be used.

Dostert U.S. Pat. No. 2,777,901, issued Jan. 5, 1957, Yamamoto U.S. Pat. No. 4,139,954, issued Feb. 20, 1979, and Meeder U.S. Pat. No. 4,354,841, issued Oct. 19, 1982 each disclose a product and/or method wherein prerecorded phrases in a foreign language are associated with their equivalent phrases in a native language.

Dosert discloses an apparatus for binaural listening wherein recordings and reproductions of foreign and native language phrases may be presented bilaterally, unilaterally, or simultaneously. No prerecorded arrangement is specified, but the learner may adjust the time relation between phrases delivered to separate ears so that the foreign language phrase leads, is simultaneous, or lags in presentation with respect to the correlated known language phrase.

Yamamoto discloses prerecorded phrases that alternate foreign and native language presentations on adjacent magnetic tracks staggered to be associated in a sequential time relation. Intermediate sections of the tape between the staggered phrases contain background sounds to mask low volume sounds that may be maganetically induced from recorded sections on an adjacent track. Recorded sections of the foreign and native language phrases are not opposite to each other in the transverse direction of the tape.

Meeder discloses prerecorded alternating foreign and native related phrases that do not overlap and have intermediate sections with continuous background sound coincident with and substantively related to the respective foreign and native phrases. The prerecorded material is presented through separate tracks of a multi-track tape that may be used on conventional monaural or stereo playback apparatus.

Heretofore there has not been available auditory instructional material using two or more series of related words or phrases whose prerecorded pattern for presentation to the two ears enhances associative learning by providing for the effects of both simultaneous and sequential contiguity in the time relations between the foreign and native words or phrases. Further, prior disclosures do not give the optimal combination of intensity, time relations, and ear of presentation for the foreign and native phrases or verbal stimulus and response coordinated with their visual representations to facilitate associative learning.

SUMMARY OF THE INVENTION

According to the present invention, a prerecorded audio medium, such as a magnetic tape or audio-video disc is provided wherein at least two substantively related series of longitudinally spaced words or phrases are recorded on respective tracks or channels of the medium. The words of each track or channel are separated by unrecorded or silent intermediate sections and are presented through headphones for binaural listening.

Each pair of foreign and native words are given in two presentations. In the first presentation, the native word or stimulus is presented to the left ear and the foreign word or response is presented to the right ear. The stimulation in this presentation is called dichotic because the sound waves are completely uncorrelated between the ears. Also, the native word is presented either slightly leading or simultaneous with the foreign word and is at a slightly lower intensity than the foreign word. The next presentation has the foreign word presented simultaneously to both ears with correlated sound waves called diotic stimulation, as found in the normal speaking and listening environment.

The auditory presentations are concurrent with exposure to visual representations of the native and foreign word that are shown in parallel with the auditory spatial locations. Thus, the native word appears on the left and the foreign word on the right, for example, native word—foreign word. The stimulus or native word is shown in smaller symbols than the response or foreign word. With auditory presentation from magnetic tape, the corresponding visual materials may be printed on cards or in booklets. With auditory presentations from audio-video discs, the corresponding visual materials may be presented through cathode ray tubes or other electronic-chemical devices.

The pattern of the audio and visual presentations permit the learner to adjust attention between the presentations of the native and foreign words within and across sensory modalities. In particular, the temporal and sequential contiguity of the native and foreign words provided in the dichotic-diotic presentations facilitate the learned association between the words without increased mental effort.

Other objects and advantages will become evident in the following detailed description as read in connection with the accompanying drawings.

BRIEF DESCRIPTION OF THE DRAWINGS

FIG. 1 is a schematic view of a prerecorded magnetic audio tape made in accordance with the present invention.

FIG. 2 is a schematic view of prerecorded visual representations that accompany the auditory presentations in accordance with the present invention.

FIG. 3 is a schematic view of a prerecorded audio-video tape made in accordance with a second embodiment of the invention.

FIG. 4 is a schematic view of a variation of the second embodiment of the invention.

DETAILED DESCRIPTION

Referring to the drawings, FIG. 1 shows a magnetic audio tape 10, having tracks or channels A and B. Auditory sets 20-23, 30-33, and 40-43 are prerecorded on the channels A and B as more fully explained hereafter. The tape may be reel-to-reel or cassette mounted and moves in the direction of the arrow 12 while fixed in a stereo playback device. The tracks are separated by an intermediate longitudinally extending strip 14 to prevent magnetic induction across or between the tracks. It is understood that multitrack tapes may be used to provide for an increased amount of prerecorded materials that may be played back from the additional tracks in the same or reverse direction. Alternatively, the prerecorded materials may be on phonorecords or computer diskettes that provide for similar stereo playback of the auditory materials.

A native or stimulus word or phrase 20 is on channel A and is presented through a headphone to the learner's left ear concurrent with the presentation of a related foreign or response word or phrase 21 through a headphone to the learner's right ear. After a silent interval 16 of about one to one and one-quarater seconds, the foreign word or phrase 21 is repeated 22 and 23 synchronously from tracks A and B through headphones to both ears of the learner.

For some class of people, a small part of the population of left-handed people, the optimal ears of presentation for the first presentation is reversed so that the native word is heard at the right ear and the foreign word at the left ear. The next presentation is the same with the foreign word at both ears. These people will determine the ear-word combination by pretest so that the foreign word or phrase will be presented to the ear that provides clearer, louder, or easier perception during dichotic stimulation.

The native word or phrases 20, 30, and 40 and others in the extended series are prerecorded at a slightly lower intensity than the corresponding foreign word or phrases 21, 31 and 41 and others in the extended series.

In the dichotic presentation, the onset of the native word or phrase 20 is synchronized with that of the foreign word or phrase 21. In this word pair (20-21), the duration is shown as being shorter for the foreign term 21 compared to the native term 20, but it may be longer also. The following dichotic word pairs 30-31 and 40-41 show that the onset of the native words 30 and 40 may precede or lead the onset of the foreign words 31 and 41, respectively. Preliminary tests show, surprisingly, that improved results are obtained when the onset of the native word precedes the onset of the foreign word by approximately 50 milliseconds. Also, the foreign words 21, 31, and 41 may be shorter or longer in duration as compared to the native words 20, 30, and 40, respectively, as illustrated in FIG. 1. In other words, the foreign words in the dichotic pair may terminate in the presence or absence of the concurrent native words, regardless of the timing relation between the onsets of the native and foreign words.

The learner listens to the dichotic-diotic word sequence while viewing the corresponding visual representations of the auditory presentations as shown in FIG. 2. The visual representations of the native or stimulus words 50, 60, and 70 correspond respectively to audio native or stimulus words 20, 30, and 40. Likewise, the visual representations of the foreign or response words 51, 61, and 71 correspond to the audio presentations of the same 21, 31, and 41. The native or stimulus words 50, 60, and 70 are presented in smaller symbols than the foreign or response words 51, 61, and 71. The learner uses the visual materials in parallel with the auditory presentations to guide repetition of the native and foreign words during the silent intervals 16. The overall durations of silent intervals for specific words are determined by the duration of the word pairs in relation to a time period of one second. Thus, the learner hears the dichotic presentation 20-21 and then the diotic presentation 22-23 while viewing the visual presentation 50-51 and reciting native and related foreign words or just the foreign word depending upon the stage of learning. This procedure is continued with the series of paired words or phrases or stimuli and responses to enhance their learned association.

A second embodiment of the invention is shown in FIGS. 3 and 4. The dichotic-diotic words or phrases and corresponding visual representations are presented to the learner from an integrated audio-video tape or disk 110 having channels A, B, and C. The tape 110 is mounted in an audio-video player and moves in the direction of arrow 112. The auditory native words or phrases 120, 130, and 140 and the respective, corresponding foreign words or phrases 121, 131, and 141, and others in an extended series, are prerecorded on separate channels A and B in dichotic-diotic sequences having the same intensity and time relations as described above for the tape shown in FIG. 1. The visual words or phrases to accompany the auditory presentation are prerecorded on the video channel C in either or both of two different formats as described hereafter.

FIG. 3 shows one format wherein each visual word or phrase pair 150, 160, 170 is presented concurrently as single items with each corresponding dichotic-diotic auditory sets 120-123, 130-133, 140-143, respectively. For example, if in using English to learn Spanish the audio stimulus 120 is "house" and the audio response 121 is "casa", then the video presentation 150 would be a visual display or representation of the words "house-CASA". Likewise, if the audio stimulus-response set 130-133 is "table-mesa" then the visual representation 160 would be the words "table-MESA". Preferably, the video presentations 150, 160, 170 are presented concurrently with audio sets 120-123, 130-133 and 140-143, respectively.

FIG. 4 shows another format wherein the video presentation 180 comprises a list of several visual word or phrase pairs that is presented continuously with the discrete presentations of the corresponding dichotic-diotic auditory pairs 120-123, 130-133, and 140-143. Thus, for example, the video presentation 180 may comprise a list of several stimulus-response pairs (as shown in FIG. 2) displayed concurrently throughout the discrete temporal sequence of the auditory pairs 120-123, 130-133, and 140-143.

In general, the single-pair visual format is most helpful for initial study and the visual-list format for later study of the new words or phrases. The number of items in the list format depends on the length of the units (i.e. single words versus phrases), the stage of learning (early, intermediate, or advanced), and the estimated level of native language reading ability (e.g. elementary school, high school, or college). In both formats, the learners self-adjust their attention between the auditory and visual presentations to optimize rehearsal of the paired words or phrases.

The foregoing detailed description is provided with preferred embodiments for clarity of explanation. The scope of the invention, however, is not so limited by such description. Varied changes may be made without departing from the scope of the invention as defined in the following claims.

What is claimed is:

1. Audio medium for educational use, having plural channels from which prerecorded sounds may be reproduced, comprising a multiplicity of sets or prerecorded sounds on said medium, each said set having a dichotic presentation and a diotic presentation, each said dichotic presentation having a stimulus on one of said channels and a first response, corresponding to said stimulus, on a second of said channels, and each said diotic presentation having a second response on both said one and said second channels, said second response of each said set corresponding to the said stimulus of that set.

2. Audio medium as in claim 1, wherein said second response is a reproduction of said first response.

3. Audio medium as in claim 1, wherein said stimulus comprises one or more words of a known language, and said first response comprises a foreign language translation of said stimulus.

4. Audio medium as in claim 1, wherein said one channel is adapted to be presented to a listener's left ear and said second channel is adapted to be presented to the listener's right ear.

5. Audio medium as in claim 1, wherein said stimulus is prerecorded at a lower audio intensity than said first response.

6. Audio medium as in claim 1, wherein said second response is prerecorded at a higher audio intensity than said stimulus.

7. Audio medium as in claim 1, further comprising means for synchronizing the onset of said stimulus and the onset of said first response substantially simultaneously.

8. Audio medium as in claim 1, further comprising means for delaying the onset of said first response relative to the onset of said stimulus abaout 50 milliseconds.

9. Audio medium as in claim 1, further comprising a silent interval between said dichotic and diotic presentations.

10. Audio medium as in claim 9, wherein said silent interval is from one to one and one-quarter second.

11. A prerecorded medium for education use comprising:
a plurality of parallel channels extending in a direction of advancement;
a multiplicity of spaced apart sets of prerecorded, audio presentations on at least atwo of said channels, each said set having a dichotic presentation followed by a diotic presentation in said direction of advancement;
each said dichotic presentation having a prerecorded stimulus on one of said channels and a prerecorded response to said stimulus on a second of said channels, at leasat a portion of said stimulus being transverse to at least a portion of said response; and
each said diotic presentation having reproductions of the said dichotic response of that set on both said one and said second channels, said reproductions being in substantially transverse alignment.

12. A prerecorded medium as in claim 11, further comprising:
a third channel parallel to said plurality of channels;
a multiplicity of prerecorded video presentations on said third channel, at least a portion of each of said video presentations being transverse to at least a portion of each of said sets of audio presentations;
each said video presentation having a visual representation of the stimulus and an adjacent visual representation of the response of the respective said transverse set of audio presentations.

13. A prerecorded medium as in claim 12, wherein in each of said video presentations said visual representation of the stimulus is smaller in size and to the left of the said adjacent visual representation of the response.

14. A prerecorded medium as in claim 11, wherein the onset of each said stimulus is advanced with respect to the onset of each said dichotic response.

15. A learning method, comprising:
presenting an auditory stimulus to one ear of a person;
presenting a first auditory responses to said stimulus, to the other ear of the person, at substantially the same time as the presentation of said stimulus;
pausing momentarily; and
presenting a second auditory response to said stimulus to both ears of the person, said second response being a reproduction of said first response.

16. A learning method as in claim 15 wherein said stimulus comprises one or more words of a language known to the person, and and first response is a foreign language translation of said stimulus.

17. A learning method as in claim 15 wherein the onset of said first auditory response is presented about 50 milliseconds after the onset of the presentation of said stimulus.

18. A learning method as in claim 15, wherein said stimulus is presented to the listener's left ear at a predetermined audio intensity, and said first response is presented to the listener's right ear at a higher audio intensity than said stimulus.

19. A learning method as in claim 15 further comprising the step of visually displaying said stimulus and said first response to the person at least during said pausing step.

20. A learning method as in claim 19 wherein said stimulus is visually displayed in a smaller size than said response.

* * * * *